United States Patent [19]

Broadbent

[11] 4,408,793

[45] Oct. 11, 1983

[54] CURTAINSIDED VEHICLES

[76] Inventor: Edward G. Broadbent, Radnor Park Trading Estate, West Heath, Congleton, Cheshire, CW12 4QA, England

[21] Appl. No.: 313,146

[22] Filed: Oct. 20, 1981

[30] Foreign Application Priority Data

Oct. 24, 1980 [GB] United Kingdom ............... 8034421

[51] Int. Cl.³ ........................................... B62D 25/00
[52] U.S. Cl. .................................... 296/181; 296/183
[58] Field of Search ............... 296/181, 183, 195, 202, 296/43, 50, 146

[56] References Cited

U.S. PATENT DOCUMENTS 2,446,800  8/1948  Arrighi ................................. 296/183
3,909,552  1/1973  Broadbent ........................... 296/183

FOREIGN PATENT DOCUMENTS 2752326  5/1978  Fed. Rep. of Germany ...... 296/183
1542812  3/1979  United Kingdom ............... 296/183

*Primary Examiner*—Robert R. Song
*Attorney, Agent, or Firm*—Sughrue, Mion, Zinn, Macpeak and Seas

[57] ABSTRACT

A curtainsided vehicle has a pair of rear pillars extending between the roof and the bed of the vehicle. Each of these pillars is carried by a pair of supports disposed at right-angles to the pillar and pivoted respectively to a top rail and to the chassis of the vehicle. Each pillar mounts a locking mechanism which when released allows pivoting of the supports to move the pillar outboard of the vehicle bed. If the vehicle is long enough there can be provided intermediate pillars which have this feature of being able to be pivoted outboard of the bed of the vehicle.

5 Claims, 13 Drawing Figures

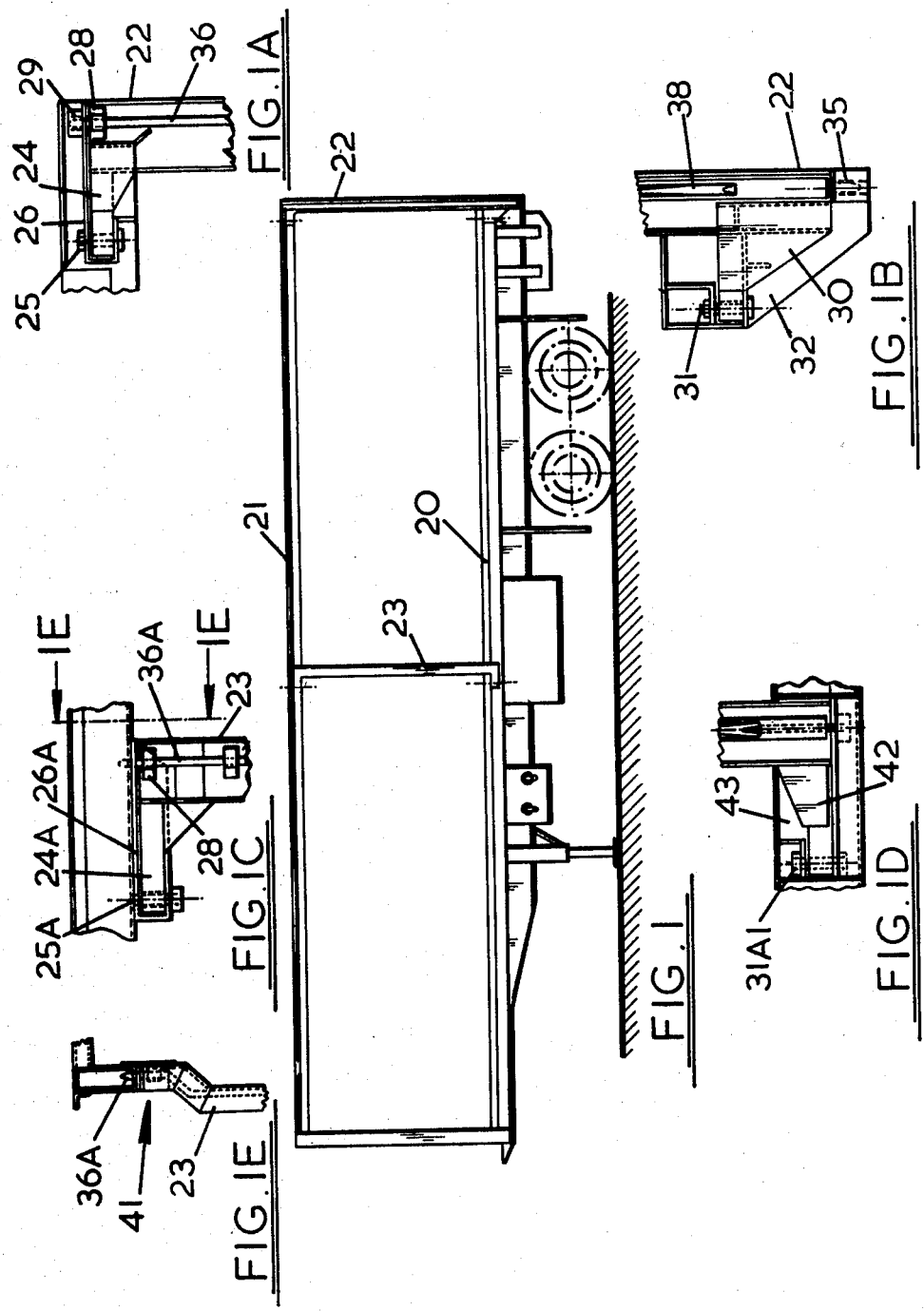

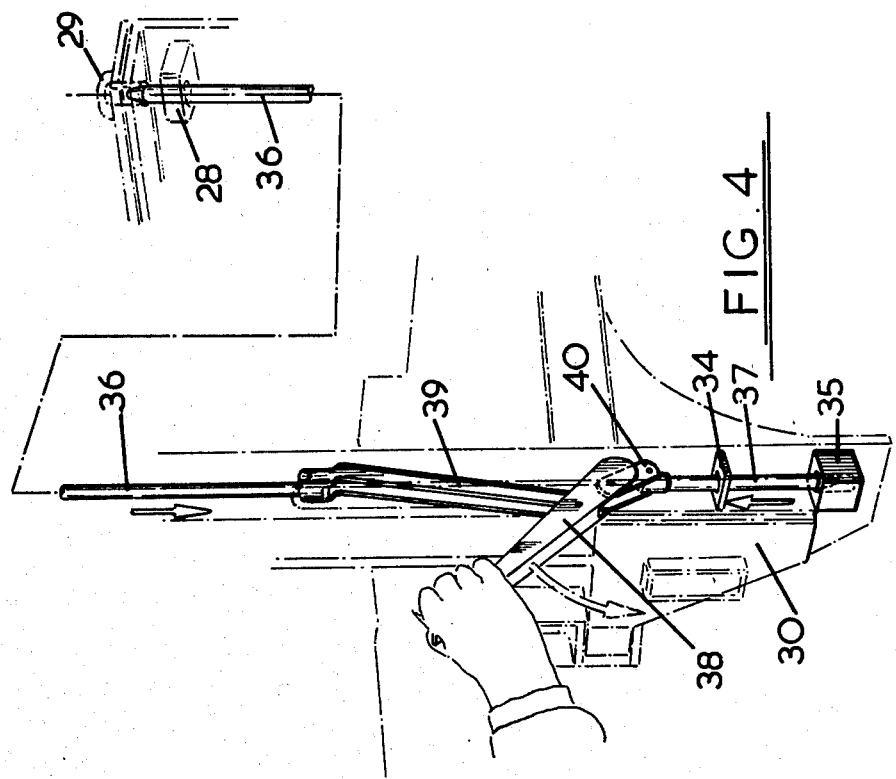
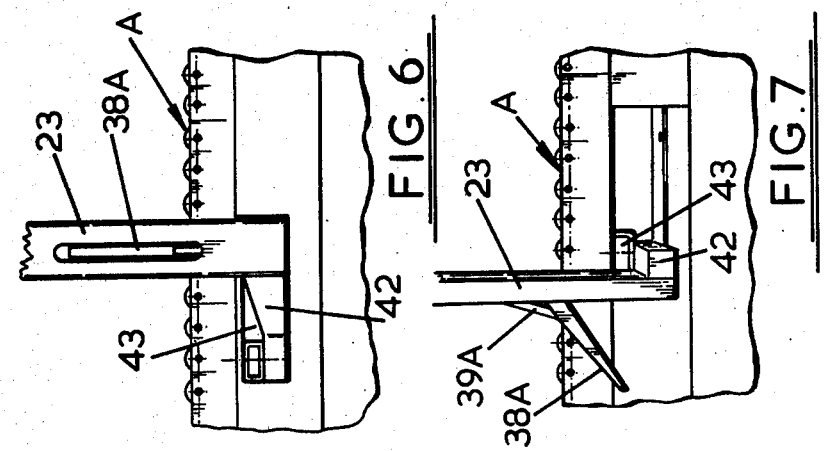

CURTAINSIDED VEHICLES

This invention relates to curtainsided vehicles.

Generally, a curtainsided vehicle comprises a load-carrying body defined by a cargo-supporting bed or floor and a roof supported above the bed by pillars with at least one, and preferably both, of the lateral sides of the body being closable by curtains withdrawable to an end of the body to give access for cargo loading and discharge. Examples of such vehicles are disclosed in our U.S. Pat. Nos. B1,262,879, B1,262,880, 1,542,811 and 1,542,812.

It is customary to load and unload such vehicles from the sides, the curtains which normally close the sides being drawn to one end of the vehicle body for this purpose. Some curtainsided vehicles additionally make provision for rear loading and unloading, the back of the vehicle body also being open and generally closed by a withdrawable curtain. It has been found that the supporting pillars tend to impede loading or unloading whether same is being effected from the side or the rear of the vehicle. For example, it has been found that, when it is desired to load from the open back of the vehicle, due, for example, to the presence of a load-receiving roller conveyor extending the length of the vehicle bed, the spacing between opposed supporting pillars between the roof and bed of the vehicle is insufficient and the pillars consequently tend to impede easy loading of the vehicle.

It is an object of the present invention to provide a curtainsided vehicle wherein loading or unloading, either from the side or the rear, is facilitated.

According to the present invention there is provided a curtainsided vehicle comprising a pillar between the roof and the bed of the vehicle, the pillar being carried by a pair of supports disposed normally to the pillar and pivoted respectively to a top rail and to the chassis of the vehicle, the pillar mounting a locking mechanism which secures the pillar in position, and which, when released, allows pivoting of the supports to move the pillar outboard of the vehicle bed.

Preferably, the vehicle has, at its rear, a pair of supporting pillars, one at each side of the vehicle bed, both of the pillars being movable outboard as aforesaid.

Preferably, if the vehicle is sufficiently long to warrant intermediate supporting pillars between roof and bed, these intermediate pillars are also movable outboard as aforesaid.

Each pillar is preferably hollow and mounts top and bottom guided shoot bolts engageable in fixed guides on the vehicle structure, the shoot bolts being connected by a linkage mechanism operated by a lever handle exposed at an opening in the pillar wall.

Preferably, the linkage mechanism is such that the top shoot bolt releases before the bottom shoot bolt, while, upon locking, the sequence is reversed.

An embodiment of the present invention will now be described by way of example, in which:

FIG. 1 is a side elevation of a curtainsided vehicle according to the invention with the curtains removed;

FIGS. 1A and 1B are detail views of the top and bottom mountings of a rear pillar;

FIGS. 1C, 1D and 1E are detail views of the top and bottom mountings of an intermediate pillar. FIG. 1E being a section of the line 1E—1E of FIG. 1D;

FIG. 4 is a fragmentary perspective view of the shoot bolt mechanism employed with the various pillars;

FIGS. 6 and 7 are fragmentary side views of an intermediate pillar in inboard and outboard positions respectively.

Figure 3:
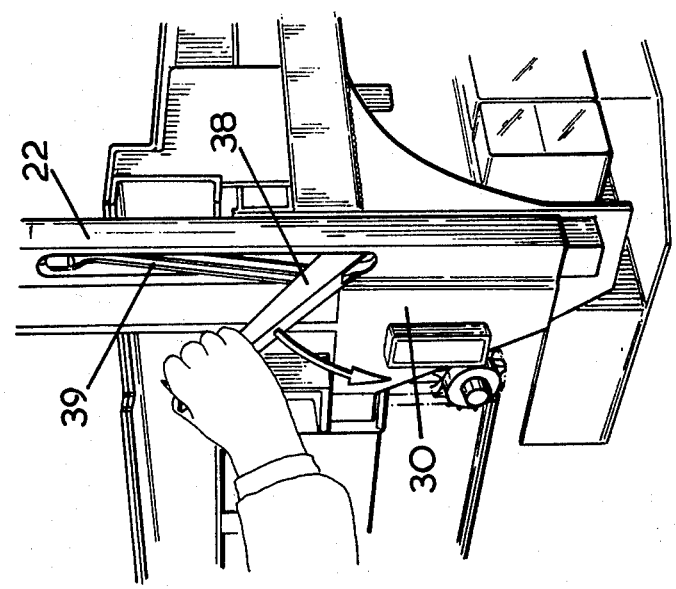
FIGS. 2 and 3 are fragmentary perspective views of the bottom rear pillar mounting, FIG. 3 showing releasing of the pillar.
Figure 2:
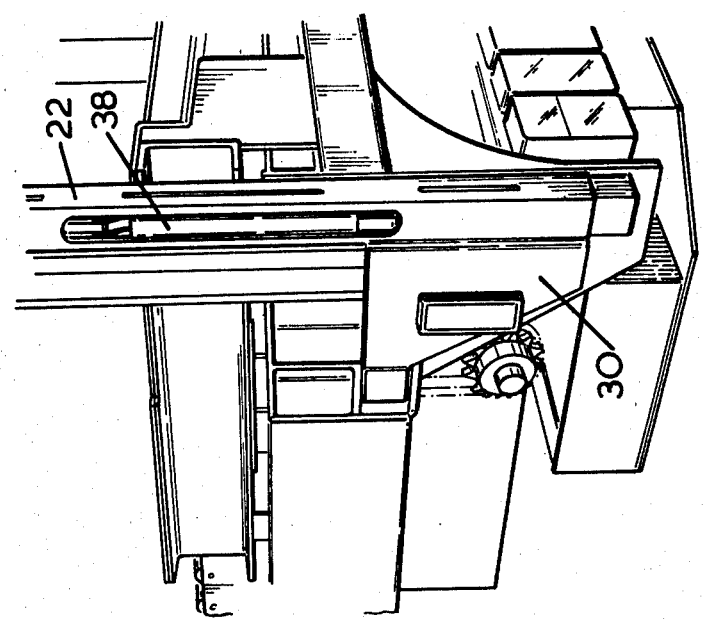

The vehicle, in this instance, has two side-by-side, load-handling roller conveyors A and B (FIG. 8) extending the length of the vehicle bed 20 and necessitating rear loading.

The vehicle has, supporting the roof 21 above the bed 20, two rear pillars 22 and two intermediate pillars 23.

Reference is made to one of the rear pillars 22 (both rear pillars are identical).

The rear pillar 22 is of hollow rectangular section and at its top has an integral lateral arm 24 pivoted as indicated at 25 to a bracket 26 welded to a top rail of the vehicle structure. The arm 24 has a guide eye 28 secured thereto which is aligned with a guide eye 29 on the bracket 26 when the pillar 22 is in normal inboard position.

The pillar 22 at its bottom has fast therewith a lateral plate 30 pivoted as indicated at 31 to a bracket 32 welded to chassis structure of the vehicle. The plate 30 has a guide 34 and the bracket 32 has at its bottom a hollow lug 35.

A locking mechanism is provided to immobilise the pillar 22 relative to brackets 26 and 32 and hold it in its normal inboard position.

This mechanism comprises a top shoot bolt 36 (see particularly FIG. 4) and a bottom shoot bolt 37 both operated by a linkage including a handle 38 exposed at an opening in a side wall of the pillar 22. Top shoot bolt 36 is pivotally connected by a link 39 to the handle 38 intermediate its ends, and the bottom shoot bolt 37 is pivotally connected by a link 40 to the handle 38 between the link 39 and handle 38.

When the pillar 22 is in normal inboard position, top shoot bolt 36 engages in both guide eyes 28 and 29, bottom shoot bolt 37 engages in the lug 35 and the handle 38 lies within the pillar 22.

To move the pillar 22 outboard, the operator grasps the handle 38 and pulls it outwards and downwards (FIGS. 3 and 4) which first pulls top shoot bolt 36 downwards clear of guide eye 29. Continued pulling on the handle pulls bottom shoot bolt 37 upwards out of the lug 35 and the operator can then swing the pillar 22 outboard of the vehicle bed 20 thus increasing the loading width of the vehicle.

When the vehicle is loaded, the operator swings pillar 22 inboard and pivots the handle 38 upwardly firstly to engage bottom shoot bolt 37 and then top shoot bolt 36.

The structure of the intermediate pillar 23 is substantially the same as that of the rear pillar 22 and like parts are given the same references with the suffix "A". However, some detail differences should be noted. At the top, the intermediate pillar 23 is cranked as indicated at 41 (FIG. 1E) and this necessitates cranking of the top shoot bolt 36A.

At the bottom, bracket 32 and lug 35 are omitted and the plate 30 is replaced by an arm 42 which normally lies within a recess 43 of the chassis, a hole being provided to receive the bottom shoot bolt.

Figure 8:
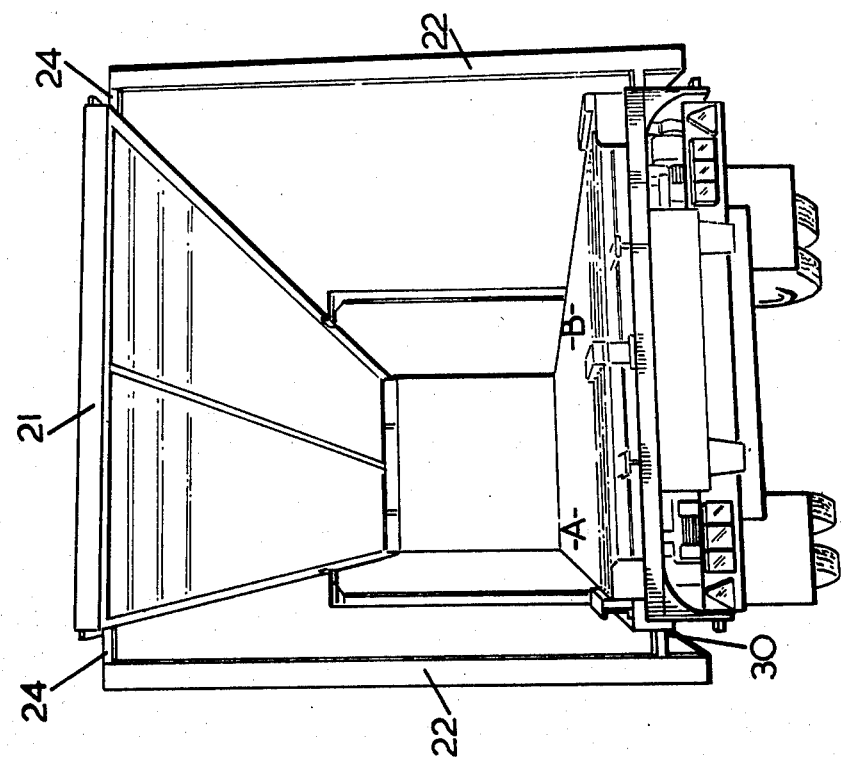
FIG. 8 is a rear view of the vehicle with all pillars moved outboard.
Figure 5:
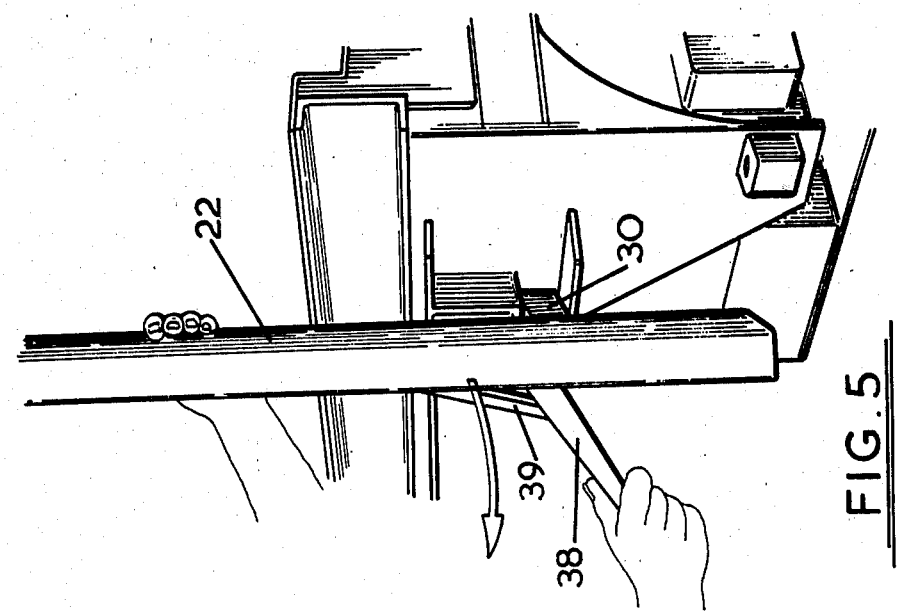
FIG. 5 is a fragmentary perspective view of a rear pillar partially moved outboard.

FIG. 8 clearly shows the increased loading width which the present invention provides for rear loading of a curtainsided vehicle. The latter expression includes herein and in the claims vans, trucks, railway vehicles and containers which can be carried on vehicles.

It is envisaged that the rear pillars may be fixed with only the intermediate pillars being movable outboard of the vehicle bed.

It is also envisaged that only one rear pillar and/or one intermediate pillar may be movable outboard of the vehicle bed.

What is claimed is:

1. A curtainsided vehicle comprising a pillar between the roof and the bed of the vehicle, the pillar being carried by a pair of supports disposed normally to the pillar and pivoted respectively to a top rail and to the chassis of the vehicle, the pillar mounting a locking mechanism which secures the pillar in position, and which, when released, allows pivoting of the supports to move the pillar outboard of the vehicle bed.

2. A vehicle as claimed in claim 1 comprising, at its rear, a pair of pillars, one at each side of the vehicle bed and at least one of which is movable outboard of the vehicle bed.

3. A vehicle as claimed in claim 1 or 2, comprising intermediate pillars between the rear pillars and the front of the vehicle, at least one of which intermediate pillars is also movable outboard of the vehicle bed.

4. A vehicle as claimed in claim 1 in which the or each pillar is hollow and mounts top and bottom guided shoot bolts engageable in fixed guides on the vehicle structure, the shoot bolts being connected by a linkage mechanism operated by a lever handle exposed at an opening in the pillar wall.

5. A vehicle as claimed in claim 4, in which the linkage mechanism is such that the top shoot bolt releases before the bottom shoot bolt, while, upon locking, the sequence is reversed.

* * * * *